Feb. 14, 1950
G. GUSTAFSON
2,497,726
WHEEL JACKING APPARATUS
Filed Dec. 13, 1947
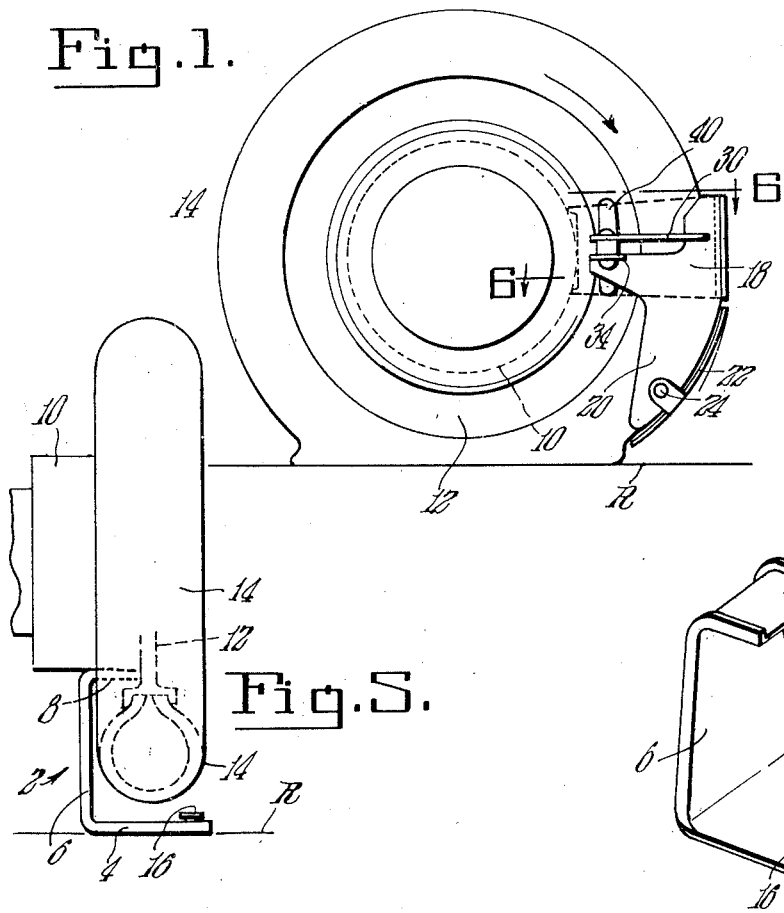
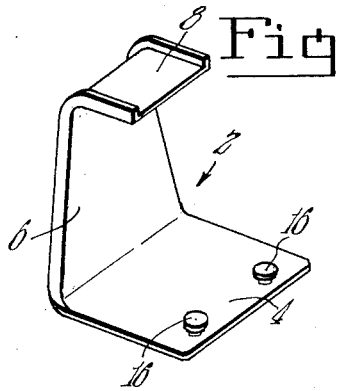
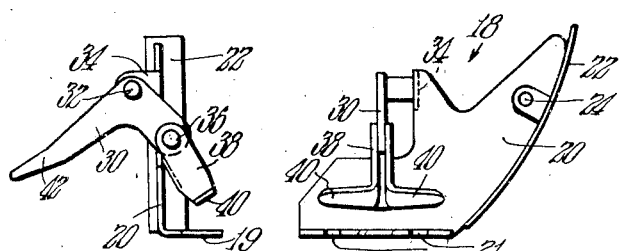
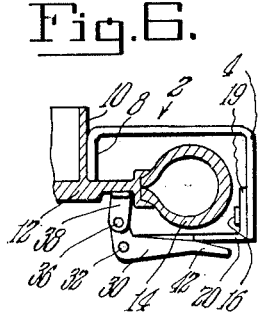
INVENTOR.
Gustaf Gustafson
BY
Walter C Ross
Attorney Patented Feb. 14, 1950

2,497,726

UNITED STATES PATENT OFFICE 2,497,726

WHEEL JACKING APPARATUS

Gustaf Gustafson, Groton, Conn.

Application December 13, 1947, Serial No. 791,622

3 Claims. (Cl. 254—94)

This invention relates to improvements in apparatus for jacking up vehicle wheels to facilitate the removal from or the application of a wheel or tire.

The principal objects of the invention are directed to the provision of apparatus which may be associated with a vehicle from which or to which a wheel or tire is to be removed or applied. The apparatus is so constructed and arranged that it may be associated with a vehicle in such a manner that the vehicle may be moved to rotate the wheel whereupon the apparatus is self-jacking to elevate the wheel to facilitate the removal of the wheel or tire.

The novel objects of the invention are accomplished by the provision of a novel combination and arrangement as will hereinafter appear.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a side view of a wheel having a deflated tire thereon with the apparatus of the invention associated therewith;

Fig. 2 is a perspective view of the jack member of the invention;

Figs. 3 and 4 are end and side elevational views of the mechanism of the invention for securing the jack member to the wheel;

Fig. 5 is an end elevational view of the jack in association with a tire and wheel; and Fig. 6 is a sectional view on the line 6—6 of Fig. 1.

Referring now to the drawings more in detail, the invention will be fully described.

A jack 2 is provided which has a base plate 4 for resting on the roadway R and an upwardly extending rear web 6 and an upper table 8. The jack is adapted and arranged whereby the table 8 may be located against a brake drum 10 of a wheel for supporting an axle upwardly from the roadway R as shown in Fig. 5. The wheel is represented by 12 and the tire by 14.

Lock studs 16 are provided on the base plate 2 and a bracket 18 has a foot 19 having slots 21 which receive the members 16. A web part 20 of the bracket 18 has a shoe 22 which is preferably pivoted thereto at 24. The shoe is curving as shown.

A lever 30 is pivoted at 32 to an ear 34 of the bracket 18 and it has pivoted thereto at 36 a clamp 38 provided with side pads 40. The lever 30 is also provided with a manually engageable part 42.

In use, in the event of a flat tire, the jack is placed adjacent the inside of the wheel with the table 8 thereof against the brake drum 10 and wheel 12, the base plate 4 being disposed transversely of the tire 14. The bracket 18 has its foot 19 on the base plate 4 with the members 16 in the slots 21 of the said foot. The pads 40 are brought against the side of the wheel 12 and the lever 42 is swung downwardly so that the member 38 with its pads against the wheel is wedged with a toggle action between the pivotal point 32 and the side of the wheel. In this way, the bracket being secured to the plate 4 of the jack, the bracket and jack are clamped to the wheel.

Then the vehicle may be moved so that the wheel rotates in the direction of the arrow shown in Fig. 1 whereupon the member 2 swings around under the wheel and engages the roadway so as to elevate the brake drum lifting the tire from the roadway.

With the wheel jacked up by the jack member bearing on the roadway and interposed between the roadway and the brake drum the bracket may be unclamped from the wheel and jack to permit the wheel or tire to be removed in the usual manner.

It will be observed that the jack member is adapted to support the axle in an elevated position. It is readily and easily associated with the vehicle by means of the bracket so that by movement of the vehicle to rotate the wheel the member is brought into engagement with the roadway to elevate the axle and locate the jack member beneath the brake drum.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Jack apparatus adapted to be secured to a flat tire on a wheel of a vehicle and engage the brake drum thereof for elevating the tire comprising in combination, separate jack and bracket members, said jack member provided with a web portion for engaging an inner side of a tire and having an outer base for overlying the tread of a tire and resting on a roadway and an upper table portion for engaging a brake drum, said bracket having a web portion for overlying an outer side of a tire and provided with a foot portion disposed transversely thereof for superposing on the base of the jack member, engageable means on said base and foot for releasably securing the jack member and bracket together, clamp means movable on said bracket for pressing against the outer side of a tire whereby said bracket and jack member engage opposite sides of and are secured to said tire, and a longitudinal shoe pivoted to said bracket for overlying the tread of said tire adjacent and downwardly of said secured together base and foot which is curved longitudinally similarly to the circumferential curvature of a tire tread, all adapted and arranged whereby with the bracket and jack members secured together and to a tire the tire may be rolled on the roadway so that the shoe engages and rolls thereon so that the base of the jack member engages and rests on said roadway and elevates said tire.

2. Jack apparatus adapted to be secured to a flat tire on a wheel and engage the brake drum thereof for elevating the tire comprising in combination, separate jack and bracket members, said jack member provided with a web portion for engaging an inner side of a tire and having an outer base for overlying the tread of a tire and resting on a roadway and an upper table portion for engaging a brake drum, said bracket having a web portion for overlying an outer side of a tire and provided with a foot portion disposed transversely thereof for superposing on the base of the jack member, engageable means on said base and foot for releasably securing the jack member and bracket together, clamp means movable on said bracket for pressing against the outer side of a tire whereby said bracket and jack member engage opposite sides of and are secured to said tire, and a longitudinal shoe pivoted to said bracket for overlying the tread of said tire adjacent and downwardly of said secured together base and foot which is curved longitudinally similarly to the circumferential curvature of a tire tread, all adapted and arranged whereby with the bracket and jack members secured together and to a tire the tire may be rolled on the roadway so that the shoe engages and rolls thereon so that the base of the jack member engages and rests on said roadway and elevates said tire, and said engageable means including studs on the base of said jack member and slots provided in the foot of said bracket in which said studs are receivable.

3. Jack apparatus adapted to be secured to a flat tire on a wheel of a vehicle and engage the brake drum thereof for elevating the tire comprising in combination, separate jack and bracket members, said jack member provided with a web portion for engaging an inner side of a tire and having an outer base for overlying the tread of a tire and resting on a roadway and an upper table portion for engaging a brake drum, said bracket having a web portion for overlying an outer side of a tire and provided with a foot portion disposed transversely thereof for superposing on the base of the jack member, engageable means on said base and foot for releasably securing the jack member and bracket together, clamp means movable on said bracket for pressing against the outer side of a tire whereby said bracket and jack member engage opposite sides of and are secured to said tire, and a longitudinal shoe pivoted to said bracket for overlying the tread of said tire adjacent and downwardly of said secured together base and foot which is curved longitudinally similarly to the circumferential curvature of a tire tread, all adapted and arranged whereby with the bracket and jack members secured together and to a tire the tire may be rolled on the roadway so that the shoe engages and rolls thereon so that the base of the jack member engages and rests on said roadway and elevates said tire, and said engageable means including studs on the base of said jack member and slots provided in the foot of said bracket in which said studs are receivable, and said clamp means including a lever pivoted to said bracket having a manually engageable portion at one end and a clamp pivoted to an opposite end thereof which is provided with the engaging pads.

GUSTAF GUSTAFSON.

REFERENCES CITED

The following references are of record in the file of this patent:

UNITED STATES PATENTS

| Number | Name | Date |
| --- | --- | --- |
| 1,933,488 | Twomey | Oct. 31, 1933 |
| 2,347,888 | Currie | May 2, 1944 |